UNITED STATES PATENT OFFICE.

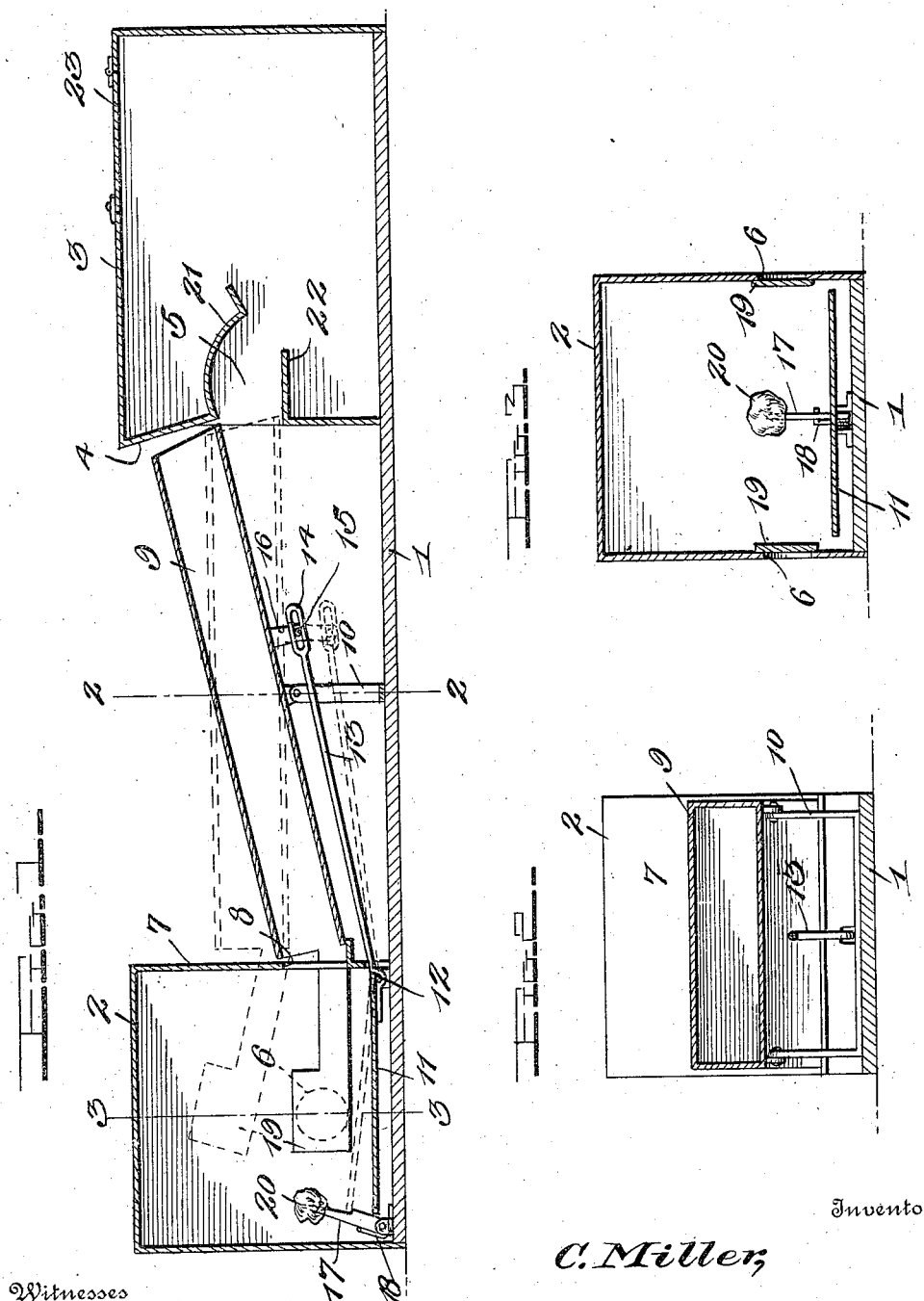

CLIFTON MILLER, OF BROOKSVILLE, KENTUCKY.

ANIMAL-TRAP.

1,053,053.

Specification of Letters Patent.

Patented Feb. 11, 1913.

Application filed July 13, 1912. Serial No. 709,246.

*To all whom it may concern:*

Be it known that I, CLIFTON MILLER, a citizen of the United States, residing at Brooksville, in the county of Bracken and State of Kentucky, have invented certain new and useful Improvements in Animal-Traps, of which the following is a specification, reference being had to the accompanying drawings.

This invention comprehends certain new and useful improvements in animal traps and relates more particularly to traps of the type generally designated as victim-set.

The primary object of the invention is to provide a trap of this type which shall be extremely simple in construction, cheap to manufacture, efficient in operation and which shall be automatically operated so as to catch and retain a plurality of animals.

The invention also aims to generally improve devices of this nature to render them more useful and commercially desirable.

With these and other objects in view, as shall become more apparent as the description proceeds, the invention consists in certain novel features of construction and arrangement of parts as I shall hereinafter fully describe and claim.

In the embodiment of my invention, I provide an entrance cage and a retaining cage, said cages being connected by an oscillating chute which is automatically operated to open and close said cages at the proper time.

For a complete understanding of my invention reference is to be had to the following description and accompanying drawings, in which—

Figure 1 is a longitudinal sectional view, showing by dotted lines the trap as it appears when set. Fig. 2 is a transverse sectional view on the plane of line 2—2 of Fig. 1, and Fig. 3 is a transverse sectional view on the plane of line 3—3 of Fig. 1.

Similar parts are referred to in the description and accompanying drawings by like reference characters.

Referring to the drawing by numerals, 1 designates a base, upon one end of which is positioned an entrance cage or compartment 2 and upon the other end of which is mounted a retaining cage or compartment 3 which has its inner wall 4 formed with a central opening 5. The side walls of the entrance cage 2 are provided with circular openings 6 and the inner end wall 7 is formed with a transverse opening 8. A chute 9, rectangular in cross section and open at each end, is positioned longitudinally of the base 1 and extends between the cages 2 and 3 and provides a connecting passage therebetween. A U-shaped support 10 is secured to the base 1 and is pivotally connected at its ends to the under side of the chute 9, so that the latter is free to oscillate. A tilting platform 11 is positioned within the cage 2 and is pivotally connected adjacent its inner edge to the ears 12 which are secured to the base 1. This platform carries secured to its underside a rearwardly and upwardly extending connecting rod 13 which is formed with a longitudinal slot 14 in its free end. A pin 15 carried by the depending arm 16 which is connected to the underside of the chute 9, works within the slot 14 and forms a sliding connection between the rod 13 and said arm.

When the trap is in its set position, the platform 11 is supported at an angle to the base 1 by the trigger 17, which is formed with a shoulder to engage the underside of the platform adjacent its front edge. The trigger 17 is pivotally secured to the base 1 and is normally forced inwardly by the coil spring 18, which is connected at one of its ends to the base and at its other end to the trigger.

Side pieces 19 are carried by the chute 9 and project longitudinally beyond one end thereof. These side pieces are enlarged at their outer ends and are for the purpose of closing the entrance opening 6 when the trap is sprung.

It is thought that the foregoing description, in conjunction with the accompanying drawing will be sufficient to make clear the construction of my improved trap, which operates as follows: When the parts are positioned, as shown by the dotted lines in Fig. 1, the trap is set and access may be had to the cage 2, either through the openings 6 or 8. An animal in endeavoring to reach the bait 20 will be forced to ascend the platform 11 and when, by nibbling the bait, it releases the platform from engagement with the shoulder of the trigger, said platform will swing downwardly into a horizontal plane. This downward motion raises the rod 13 which, because of its sliding connection with the chute 9, tilts the same so as to bring its forward end into registry with the opening 8, in which position the side pieces 19 will cover the openings 6. The entrapped animal will then endeavor to escape by passing through the chute 9, which after the animal has passed the pivotal support 10, will swing into a horizontal plane closing the forward end of the chute and bringing the rear end into registry with the opening 5. The animal will then pass into the cage 3 and the trap is set for its next victim.

The hood 21 and an inwardly projecting flange 22 guard the opening 5 and prevent any escape therethrough. A door 23 provides means for withdrawing the caged animal.

While I have shown a preferred embodiment of my invention, I do not wish to be limited to the exact construction and arrangement of parts herein shown and described, but may make such modifications as fall within the scope and spirit of the invention.

What is claimed is:

1. A trap comprising spaced compartments having openings in their opposed walls, a chute pivotally mounted between said compartments, one of which is provided with additional entrance openings, means mounted in the last mentioned compartment and connected to said chute, said means being actuated by an animal to tilt the chute and bring one end into registration with one of the openings in the entrance compartment, the weight of the animal passing through said chute serving to tilt the same so as to bring its other end into registration with the opening in the second compartment, and plates formed by longitudinally extending the side walls of the chute at one end, said plates being adapted to close the entrance openings in the entrance compartment.

2. An animal trap comprising a base, spaced compartments secured to the base at opposite ends thereof and formed with openings in their opposed walls, one of said compartments being provided with additional entrance openings, a chute pivotally mounted between said compartments, and adapted to have its ends alternately registered with the openings in the opposed ends of the respective compartments, a tilting platform mounted within the entrance compartment, means for normally supporting said platform in its inclined position, a connecting rod rigidly secured at one end to said platform and slidably connected at its other end to said chute, said platform being adapted to be operated by an animal to tilt the chute and bring one of its ends opposite the opening in the end wall of the entrance compartment, the weight of the animal passing through said chute returning the same to a horizontal position and bringing its other end opposite the opening in the other compartment and means carried by said chute for the purpose of closing the entrance openings in the entrance compartment.

3. A trap comprising a base, an entrance compartment mounted on said base adjacent one end thereof, a retaining compartment carried by said base adjacent the other end thereof, said compartments being formed with openings in their opposed end walls, the entrance compartment being provided with additional openings in the side walls thereof, a chute pivotally connected intermediate its ends and positioned between said compartments, a tilting platform positioned within the entrance compartment, a spring pressed trigger adapted to normally retain said platform in an inclined position, a rearwardly and upwardly extending arm rigidly secured at one end to said platform and slidably connected at its other end to said chute, and side plates carried by the chute and adapted to close the entrance openings in the entrance cage, said platform being adapted to be actuated by an animal to tilt the chute and bring one of its ends opposite the opening in the end wall of the entrance compartment, the weight of the animal passing through said chute oscillating the same to bring its other end opposite the opening in the retaining compartment.

In testimony whereof I hereunto affix my signature in the presence of two witnesses.

CLIFTON MILLER.

Witnesses:
 EDDIE THOMPSON,
 JOHN R. THOMPSON.